(12) United States Patent
Brodersen et al.

(10) Patent No.: US 8,099,665 B2
(45) Date of Patent: Jan. 17, 2012

(54) ORGANIZING AND SORTING MEDIA MENU ITEMS

(75) Inventors: Rainer Brodersen, San Jose, CA (US); Rachel Clare Goldeen, Mountain View, CA (US); Jeffrey Ma, Redwood City, CA (US); Mihnea Calin Pacurariu, Los Gatos, CA (US); Steven Jobs, Palo Alto, CA (US)

(73) Assignee: Apple Inc., Cupertino, CA (US)

( * ) Notice: Subject to any disclaimer, the term of this patent is extended or adjusted under 35 U.S.C. 154(b) by 604 days.

(21) Appl. No.: 11/530,643

(22) Filed: Sep. 11, 2006

(65) Prior Publication Data

US 2008/0065638 A1    Mar. 13, 2008

(51) Int. Cl.
*G06F 3/00* (2006.01)

(52) U.S. Cl. .......................... 715/716; 707/752; 707/753

(58) Field of Classification Search .................. 715/204, 715/716–722, 727–730, 781–783; 707/752–753
See application file for complete search history.

(56) References Cited

U.S. PATENT DOCUMENTS

| | | | |
|---|---|---|---|
| 5,619,249 A | 4/1997 | Billock et al. | |
| 5,621,456 A | 4/1997 | Florin et al. | |
| 5,717,879 A | 2/1998 | Moran et al. | |
| 5,822,123 A | 10/1998 | Davis et al. | |
| 5,880,768 A * | 3/1999 | Lemmons et al. | 725/41 |
| 5,933,811 A | 8/1999 | Angles et al. | |
| 6,006,227 A | 12/1999 | Freeman et al. | |
| 6,216,264 B1 | 4/2001 | Maze et al. | |
| 6,335,737 B1 | 1/2002 | Grossman et al. | |
| 6,448,987 B1 | 9/2002 | Easty et al. | |
| 6,638,313 B1 | 10/2003 | Freeman et al. | |
| 6,725,427 B2 | 4/2004 | Freeman et al. | |
| 6,760,721 B1 * | 7/2004 | Chasen et al. | 707/3 |
| 6,768,999 B2 | 7/2004 | Prager et al. | |
| 6,847,977 B2 * | 1/2005 | Abajian | 709/223 |
| 6,928,433 B2 * | 8/2005 | Goodman et al. | 707/4 |
| 6,944,632 B2 | 9/2005 | Stern | |
| 7,020,652 B2 * | 3/2006 | Matz et al. | 707/7 |
| 7,096,234 B2 * | 8/2006 | Plastina et al. | 707/104.1 |
| 7,159,000 B2 * | 1/2007 | Plastina et al. | 707/104.1 |
| 7,220,910 B2 * | 5/2007 | Plastina et al. | 84/615 |
| 7,292,243 B1 | 11/2007 | Burke | |
| 7,302,639 B1 * | 11/2007 | Everhart et al. | 715/234 |
| 7,340,760 B2 | 3/2008 | Wachtfogel et al. | |
| 7,362,331 B2 | 4/2008 | Ording | |
| 7,363,591 B2 * | 4/2008 | Goldthwaite et al. | 715/763 |
| 7,367,042 B1 | 4/2008 | Dakss et al. | |

(Continued)

FOREIGN PATENT DOCUMENTS

EP    1289287    3/2003

(Continued)

OTHER PUBLICATIONS

U.S. Appl. No. 11/530,824, filed Sep. 11, 2006, Madden et al.

(Continued)

*Primary Examiner* — Weilun Lo
*Assistant Examiner* — Enrique Iturralde
(74) *Attorney, Agent, or Firm* — Fish & Richardson P.C.

(57) ABSTRACT

A method of organizing episodic content includes identifying a list of items associated with episodic content and sorting the list of items based on at least episode order upon a prompt.

33 Claims, 6 Drawing Sheets

U.S. PATENT DOCUMENTS

| | | |
|---|---|---|
| 2002/0033848 A1 | 3/2002 | Sciammarella et al. |
| 2002/0042920 A1 | 4/2002 | Thomas et al. |
| 2002/0042923 A1 | 4/2002 | Asmussen et al. |
| 2002/0083469 A1* | 6/2002 | Jeannin et al. ............. 725/135 |
| 2002/0099731 A1* | 7/2002 | Abajian ................. 707/500 |
| 2002/0175931 A1 | 11/2002 | Holtz et al. |
| 2002/0178447 A1 | 11/2002 | Plotnick et al. |
| 2003/0005445 A1 | 1/2003 | Schein et al. |
| 2003/0070167 A1 | 4/2003 | Holtz et al. |
| 2003/0093790 A1* | 5/2003 | Logan et al. ............... 725/38 |
| 2003/0110450 A1 | 6/2003 | Sakai |
| 2003/0117425 A1 | 6/2003 | O'Leary et al. |
| 2003/0142751 A1 | 7/2003 | Hannuksela |
| 2003/0149975 A1 | 8/2003 | Eldering et al. |
| 2003/0174160 A1 | 9/2003 | Deutscher et al. |
| 2004/0008211 A1 | 1/2004 | Soden et al. |
| 2004/0100479 A1 | 5/2004 | Nakano et al. |
| 2004/0140995 A1 | 7/2004 | Goldthwaite et al. |
| 2004/0150657 A1 | 8/2004 | Wittenburg et al. |
| 2004/0221308 A1 | 11/2004 | Cuttner et al. |
| 2004/0261031 A1 | 12/2004 | Tuomainen et al. |
| 2005/0005308 A1* | 1/2005 | Logan et al. ............. 725/135 |
| 2005/0041033 A1 | 2/2005 | Hilts et al. |
| 2005/0044499 A1 | 2/2005 | Allen et al. |
| 2005/0060741 A1 | 3/2005 | Tsutsui et al. |
| 2005/0091597 A1 | 4/2005 | Ackley |
| 2005/0120148 A1 | 6/2005 | Jung et al. |
| 2005/0149872 A1* | 7/2005 | Fong et al. .................. 715/727 |
| 2005/0160375 A1 | 7/2005 | Sciammarella et al. |
| 2005/0216932 A1 | 9/2005 | Danker |
| 2005/0246654 A1 | 11/2005 | Hally et al. |
| 2005/0278656 A1 | 12/2005 | Goldthwaite et al. |
| 2006/0020962 A1* | 1/2006 | Stark et al. ................. 725/32 |
| 2006/0026635 A1* | 2/2006 | Potrebic et al. ............... 725/37 |
| 2006/0031776 A1 | 2/2006 | Glein et al. |
| 2006/0074769 A1 | 4/2006 | Looney et al. |
| 2006/0090185 A1 | 4/2006 | Zito et al. |
| 2006/0265409 A1* | 11/2006 | Neumann et al. ............. 707/100 |
| 2007/0162853 A1 | 7/2007 | Weber et al. |
| 2007/0174872 A1 | 7/2007 | Jing et al. |
| 2007/0288863 A1 | 12/2007 | Ording et al. |
| 2008/0062894 A1 | 3/2008 | Ma et al. |
| 2008/0065720 A1 | 3/2008 | Brodersen et al. |
| 2008/0066009 A1 | 3/2008 | Gardner et al. |
| 2008/0066010 A1 | 3/2008 | Brodersen et al. |
| 2008/0066013 A1 | 3/2008 | Brodersen et al. |
| 2008/0066100 A1 | 3/2008 | Brodersen et al. |
| 2008/0066110 A1 | 3/2008 | Brodersen et al. |
| 2008/0092168 A1 | 4/2008 | Logan et al. |
| 2008/0122870 A1 | 5/2008 | Brodersen et al. |

FOREIGN PATENT DOCUMENTS

| | | |
|---|---|---|
| EP | 1 469 375 A1 | 10/2004 |
| EP | 1 510 911 A2 | 3/2005 |
| WO | WO 00/33573 | 6/2000 |

OTHER PUBLICATIONS

International Search Report and Written Opinion, PCT/US2007/076076; Dated Apr. 27, 2009.

Mystrands, Inc., Mystrands Discovery for Windows: Internet Citation, XP002391686; www.mystrands.com, Jul. 24, 2006.

USPTO Interview Summary U.S. Appl. No. 11/549,103, mailed Apr. 27, 2009.

USPTO Non-Final Office Action in U.S. Appl. No. 11/549,103, mailed Sep. 8, 2008.

Fish & Richardson P.C., Amendment in Reply to Office Action dated Sep. 8, 2008 in U.S. Appl. No. 11/549,103, filed Mar. 9, 2009.

USPTO Interview Summary in U.S. Appl. No. 11/549,092, mailed Apr. 21, 2009.

USPTO Non-Final Office Action in U.S. Appl. No. 11/549,092 mailed Feb. 9, 2009.

Fish & Richardson P.C., Amendment in Reply to Office Action in U.S. Appl. No. 11/549,092 dated May 11, 2009.

"Fading Image Rollovers," http://web.archive.org/web/20060111080357/http://www.javascript-fx.com/fade_rollovers/general_help/help.html. Jan. 11, 2006, 3 pages.

"Animated Image Blur," http://web.archive.org/web/20060430062528/http://www.tutorio.com/tutorial/animated-image-blur, Apr. 30, 2006, 2 pages.

USPTO Final Office in U.S. Appl. No. 11/530,824, mailed May 8, 2009, 16 pages.

* cited by examiner

FIG. 12

ORGANIZING AND SORTING MEDIA MENU ITEMS

BACKGROUND

This disclosure is related to media processing systems and methods.

Media devices, such as digital video and audio players, can include multiple functions and capabilities, such as playing stored content, browsing and selecting from recorded content, storing and/or receiving content selected by a user, and the like. These various functions can often be grouped according to content types, e.g., movies, music, television programs, photos, etc., and accessed through a user interface. The user interface can include both graphical and textual features. It is desirable that the user interface conveys information to the user in an intuitive manner. However, current media devices often present the information in a poorly organized manner, and do not provide the capability to reorganize the information according to one or more aspects related to the information.

SUMMARY

Disclosed herein are systems and methods for organizing menu items. In one implementation, an interface environment includes a menu arranged in the interface environment, the menu including a list of menu items associated with episodic content. The interface environment further includes a sort interface arranged in the interface environment, the sort interface being configured to receive a selection and to sort the list of menu items based upon the selection. The selection is operable to request sorting based upon at least an episode order.

In another implementation, instructions provided on one or more computer readable media are used to cause a processor to perform the operations comprising: generating a choice of sort options for a plurality of menu items associated with episodic content, the sort options comprising at least an episode order sort option; receiving a selection of the episode order sort option; sorting the menu items based upon an episode order in response to receipt of the selection of the episode order sort option; generating a menu comprising a list of menu items based upon the sorting of the menu items; and, presenting the menu arranged within an interface environment.

DETAILED DESCRIPTION

Figure 1:
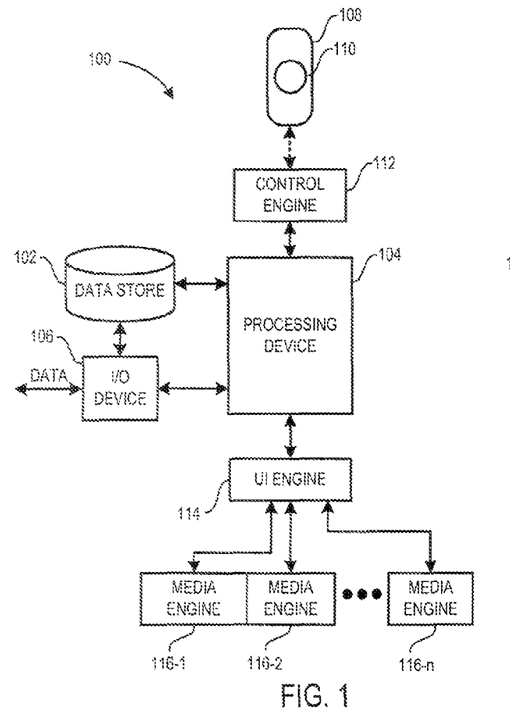
FIG. 1 is a block diagram of an example media processing system.

FIG. 1 is a block diagram of an example media processing system 100. The media processing system 100 can transmit and receive media data and data related to the media data. The media data can be stored in a data store 102, such as a memory device, and be processed by a processing device 104 for output on a display device, such as a television, a computer monitor, a game console, a hand held portable device, and the like, and/or an audio device, such as a multi-channel sound system, a portable media player, a computer system, and the like. The media processing system 100 may be used to process media data, for example, video data and audio data received over one or more networks by an input/output (I/O) device 106. Such media data may include metadata, e.g., song information related to audio data received, or programming information related to a television program received.

The media data and related metadata may be provided by a single provider, or may be provided by separate providers. In one implementation, the media processing system 100 can be configured to receive media data from a first provider over a first network, such as a cable network, and receive metadata related to the video data from a second provider over a second network, such as a wide area network (WAN). Example media data include video data, audio data, content payload data, or other data conveying audio, textual and/or video data.

In another implementation, the media processing system 100 can be configured to receive media data and metadata from a computing device, such as a personal computer. In one example of this implementation, a user manages one or more media access accounts with one or more content providers through the personal computer. For example, a user may manage a personal iTunes® account with iTunes® software, available from Apple Computer, Inc. Media data, such as audio and video media data, can be purchased by the user and stored on the user's personal computer and/or one or more data stores. The media data and metadata stored on the personal computer and/or the one or more data stores can be selectively pushed and/or pulled for storage in the data store 102 of the media processing system 100.

In another implementation, the media processing system 100 can be used to process media data stored in several data stores in communication with a network, such as wired and/or wireless local area network (LAN), for example. In one implementation, the media processing system 100 can pull and/or receive pushed media data and metadata from the data stores over the network for presentation to a user. For example, the media processing system 100 may be implemented as part of an audio and video entertainment center having a video display device and an audio output device, and can pull media data and receive pushed media data from one or more data stores for storage and processing. At the entertainment center, a user can, for example, view photographs that are stored on a first computer while listening to music files that are stored on a second computer.

In one implementation, the media processing system 100 includes a remote control device 108. The remote control device 108 can include a rotational input device 110 configured to sense touch actuations and generate remote control signals therefrom. The touch actuations can include rotational actuations, such as when a user touches the rotational input device 110 with a digit and rotates the digit on the surface of the rotational input device 110. The touch actuations can also include click actuations, such as when a user presses on the rotational input device 110 with enough pressure to cause the remote control device 108 to sense a click actuation.

In one implementation, the functionality of the media processing system 100 is distributed across several engines. For example, the media processing system 100 may include a controller engine 112, a user interface (UI) engine 114, and one or more media engines 116-1, 116-2, and 116-*n*. The engines may be implemented in software as software modules or instructions, or may be implemented in hardware, or in a combination of software and hardware.

The control engine 112 is configured to communicate with the remote control device 108 by a link, such as a wireless infrared signal or radio frequency signal. The remote control device 108 can transmit remote control signals generated, for example, from touch actuations of the rotational input device 110 to the control engine 112 over the link. In response, the control engine 112 is configured to receive the remote control signals and generate control signals in response. The control signals are provided to the processing device 104 for processing.

The control signals generated by the control engine 112 and processed by the processing device 104 can invoke one or more of the UI engine 114 and media engines 116-1-116-n. In one implementation, the UI engine 114 manages a user interface to facilitate data presentation for the media engines 116-1-116-n and functional processing in response to user inputs.

In one implementation, the media engines 116 can include one or more content-specific engines, such as a movies engine, television program engine, music engine, and the like. Each engine 116 can be instantiated to support content-specific functional processing. For example, a movie engine to support movie-related functions can be instantiated by selecting a "Movies" menu item. Example movie-related functions include purchasing movies, viewing movie previews, viewing movies stored in a user library, and the like. Likewise, a music engine to support music-related functions can be instantiated by selecting a "Music" menu item. Example music-related functions include purchasing music, viewing music playlists, playing music stored in a user library, and the like.

The media processing system 100 of FIG. 1 can also implement different functional distribution architectures that have additional functional blocks or fewer functional blocks. For example, the engines 116 can be implemented in a single monolithic engine.

Figure 2:
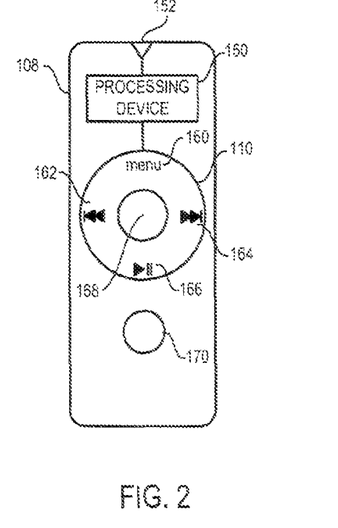
FIG. 2 is a block diagram of an example remote control device for the media processing system.

FIG. 2 is a block diagram of an example remote control device 108 for the media processing system 100. The remote control device 108 includes a rotational input device 110, a processing device 150, and a wireless communication subsystem 152. The rotational input device 110 defines a surface that can sense a touch actuation, such as the presence of a finger on the surface, and can further generate a control signal based on a rotation of the finger on the surface. In one implementation, a touch sensitive array is disposed beneath the surface of the rotational input device 110. The touch sensitive array can be disposed according to polar coordinates, i.e., r and ?, or can be disposed according to Cartesian coordinates, i.e., x and y.

The rotational input device areas 160, 162, 164, 166 and 168 are receptive to press actuations. In one implementation, the areas include a menu area 160, a reverse/previous area 162, a play/pause area 164, a forward/next area 166, and a select area 168. The areas 160-168, in addition to generating signals related to their descriptive functionalities, can also generate signals for context-dependent functionality. For example, the menu area 160 can generate signals to support the functionality of dismissing an onscreen user interface, and the play/pause area 164 can generate signals to support the function of drilling down into a hierarchal user interface. In one implementation, the areas 160-168 comprise buttons disposed beneath the surface of the rotational input device 110. In another implementation, the areas 160-168 comprise pressure sensitive actuators disposed beneath the surface of the rotational input device 110.

The processing device 150 is configured to receive the signals generated by the rotational input device 110 and generate corresponding remote control signals in response. The remote control signals can be provided to the communication subsystem 152, which can wirelessly transmit the remote control signals to the media processing system 100.

Although shown as comprising a circular surface, in another implementation, the rotational input device 110 can comprise a rectangular surface, a square surface, or some other shaped surface. Other surface geometries that accommodate pressure sensitive areas and that can sense touch actuations may also be used, e.g., an oblong area, an octagonal area, etc.

Other actuation area configurations may also be used. For example, in another implementation, the remote control device 108 can also include a separate actuation button 170. In this implementation, the areas comprise a "+" or increase area 160, a reverse/previous area 162, a "−" or decrease area 164, a forward/next area 166, a play/pause area 168, and a menu area 170.

Figure 3:
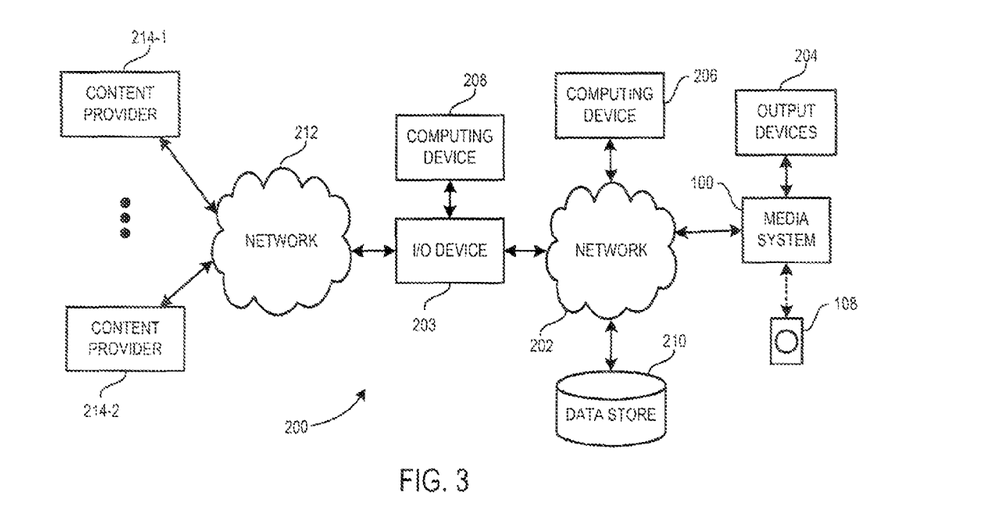
FIG. 3 is an example network environment in which a media processing system in accordance with FIG. 1 can be implemented.

FIG. 3 is an example network environment 200 in which a media processing system 100 in accordance with FIG. 1 may be implemented. The media processing system 100 receives, for example, user input through a remote control device 108 and media data over a network 202, such as a wired or wireless LAN. In one implementation, the network 202 communicates with a wide area network 212, such as the Internet, through an I/O device 203, such as a router, server, cable modem, or other computing and/or communication processing device. The media processing system 100 processes the media data for output to one or more output devices 204. The media processing system 100 can receive the media data from one or more data stores connected to the network 202, such as computing devices 206 and 208, and a data store 210.

The media data can be received through the network 212 by one of the computing devices, such as computing device 208. The network 212 can include one or more wired and wireless networks, such as the Internet. The media data is provided by one or more content providers 214. For example, the content provider 214-1 may provide media data that is processed by the media processing system 100 and output through the output devices 206, and the content provider 214-2 may provide metadata related to the media data for processing by the media processing system 100. Such metadata may include episodic content, artist information, and the like. A content provider 214 can also provide both media data and related metadata.

In one implementation, the media processing system 100 can also communicate with one or more content providers 214 directly. For example, the media processing system 100 can communicate with the content providers the wireless network 202, the I/O device 203, and the network 212. The media processing system 100 can also communicate with the content providers 214 thorough other network configuration, e.g., through a direct connection to a cable modem, through a router, or through one or more other communication devices. Example communications can include receiving sales information, preview information, or communications related to commercial transactions, such as purchasing audio files and video files.

In another implementation, the media processing system 100 can receive content from any of the computing devices 206 and 208, and other such computing devices or data stores 210 available on the network 202 through sharing. Thus, if any one or more of the computing devices or data stores are unavailable, media data and/or meta data one the remaining computing devices or other such computing devices or data stores can still be accessed.

Figure 4:
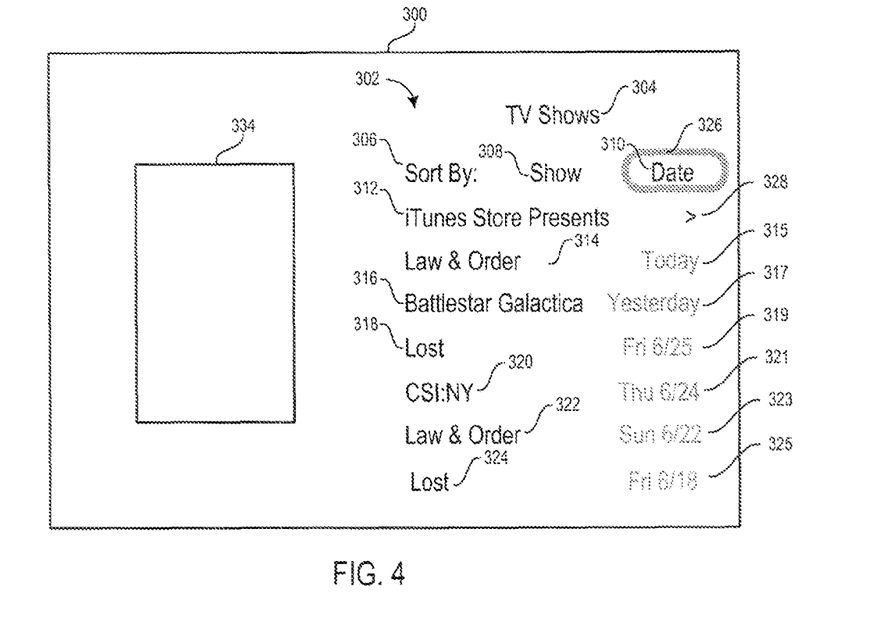
FIGS. 4 and 5 are block diagrams of an example interface environment.
Figure 5:
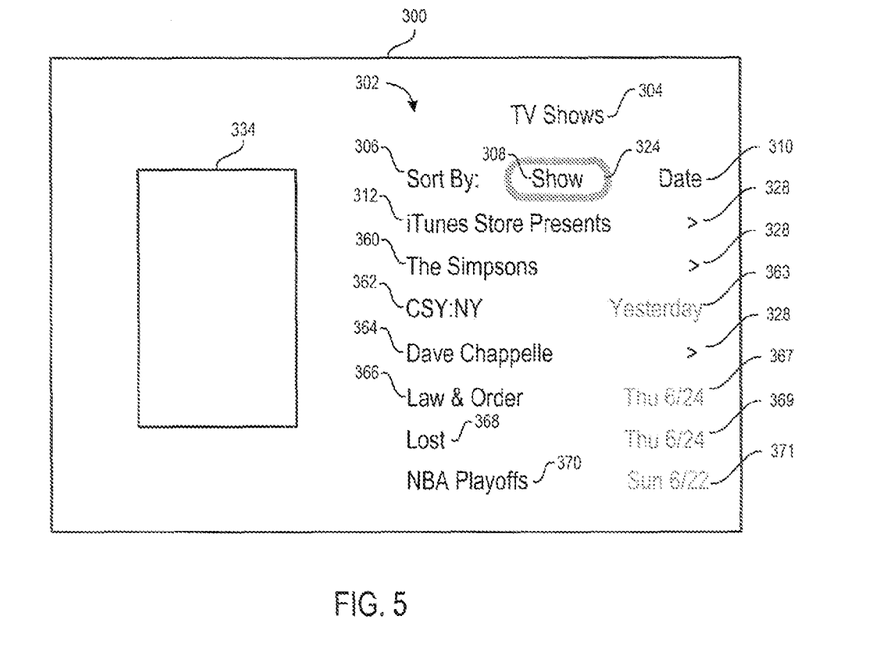

FIGS. 4 and 5 are block diagrams of an example interface environment 300. The example interface environment 300 corresponds to television content, and can, for example, appear as the end result of the transition from a higher level (e.g., closer to a "root" level) interface environment after selecting a media menu item entitled "TV Shows." A corresponding media engine 116 can, for example, be instantiated upon such transition.

In one implementation, the interface environment 300 includes a menu 302 and a menu title 304, e.g., "TV Shows." The menu 302 includes menu items 312, 314, 316, 318, 320, 322, 324. The menu 302 can also include the highlight indicator 326 that highlights a menu item. The menu items, can, for example, correspond to television shows that have either been recorded from a broadcast or purchased from a content provider.

In one implementation, the menu 302 also includes a sort field 306 that includes a first sort option 308 and a second sort option 310. Selection of the first sort option 308 can, for example, sort the content menu items by a program category, e.g., a program title. In one implementation, multiple instances of the same program title are grouped into folders, as indicated by the child indicators 328 of FIGS. 4 and 5. A single instance of a program title can, for example, be displayed according to a date, as indicated by the date fields 363, 367, 369 and 371 of FIG. 5. In one implementation, the date corresponds to an acquisition date, e.g., the date the content title was purchased from a content provider or recorded from a broadcast. In another implementation, the date corresponds to an episode order for episodic content, for example, the date the episode was aired, such as an original air date.

Selection of the second sort option 310 sorts the content menu items according to a date, as indicated by the date fields 315, 317, 319, 321, 323, and 325 of FIG. 4. In one implementation, the sort date corresponds to an acquisition date, e.g., the date the content title was purchased from a content provider or recorded from a broadcast. In another implementation, the sort date corresponds to an episode order for episodic content.

In the case where the menu items are to be sorted in accordance with an episode order, metadata including an original air date can be retrieved. As an example, metadata including an original air date can be stored in a data store (e.g., data store 102 of FIG. 1). In another example, metadata stored in a data store (e.g., data store 102 of FIG. 1) might not include an original air date. Thus, the media system 100 can include a media engine 116 configured to parse the stored metadata to extract a series title and an episode name and to retrieve an original air date associated with the series title and episode name. The original air date can be retrieved, for example, from a content provider 214, or a metadata provider, among others. Alternatively, a media engine 116 can be configured to retrieve an episode number associated with the series title and episode name. The menu items associated with the episode air dates or episode numbers can be sorted in chronological or numerical order based upon retrieved data (e.g., air date, episode number, etc.). This sort can be used to sort any menu items listed within the menu 302.

In one implementation, the first content menu item 312 is a sales content menu associated with content offered for sale. For example, the content menu item 312 is entitled "iTunes Store Presents," and includes a child indicator 328. Selecting the iTunes Store Presents menu item 312 can, for example, cause the interface environment to transition to include another menu that lists one or more menu items associated with content available for purchase by, for example, download. In one implementation, the content items listed for sale correspond to the content type of the content menu 302. For example, the interface environment 300 of FIG. 4 relates to "TV Shows," and thus the content items listed in response to selecting the highlighted menu item 312 are television programs.

The interface environment 300 can also include menu item abstractions that correspond to a menu item, which in turn corresponds to associated content. For example, the menu abstraction 334 correspond to one of the menu items 314, 316, 318, 320, 322, 324 in FIG. 4 or 360, 362, 364, 366, 368, 370 in FIG. 5. In one implementation, the menu item abstraction can be a graphical representation of the content corresponding to the highlighted menu item. For example, the menu item abstraction 334, which corresponds to the sorted menu items, can comprise digital representations of television program art or television program stills for television programs that are stored in a library (e.g., a data store 102, 210, content provider 214, etc.).

In one implementation, a set of menu item abstractions can be associated with a single menu item, or can be associated with a plurality of menu items. In the example menu interface environment 300 of FIG. 4, for example, a first set of menu item abstractions is associated with the menu item 312, and a second set of menu item abstractions is associated with remaining menu items 314-324. The first set of menu item abstractions can, for example, comprise digital representations of television program art for television programs that are offered for sale through the sales menu item 312, and second set of content abstractions can correspond to the content titles stored in a user library.

Figure 6:
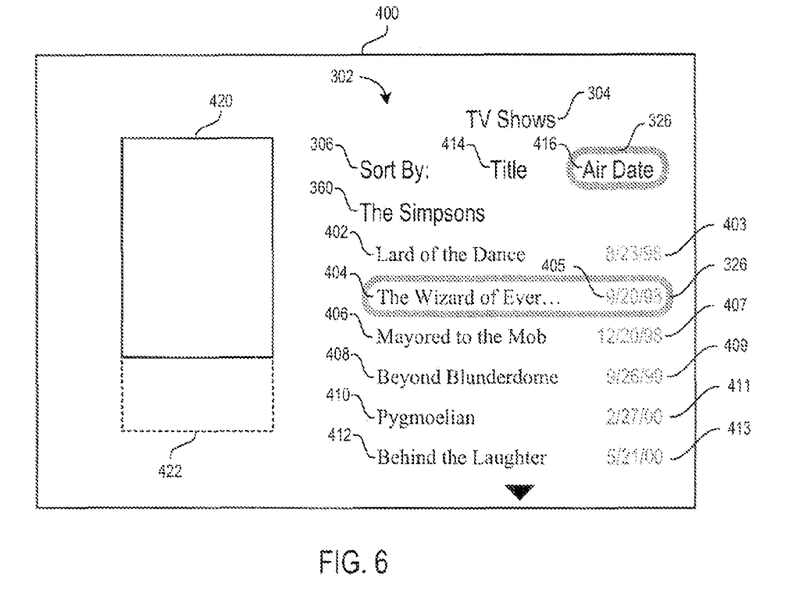
FIGS. 6-9 are block diagrams of example interface environments for organizing television content.

FIG. 6 is a block diagram of example interface environment 400 for organizing television content. The example interface environment 400 corresponds to television content, and more specifically to a particular episode series title (e.g., "The Simpsons"). Interface environment 400 can, for example, appear as the end result of the transition from a higher level (e.g., closer to a "root" level) interface environment (e.g., interface environment 300 of FIG. 5) after selecting a menu item entitled "The Simpsons." A corresponding media engine 116 can, for example, be instantiated upon such transition. As an example, transitioning back to a higher level interface environment (e.g., interface environment 300 of FIG. 5) can be performed by selecting a back button on a remote control device 108. In some examples, the menu can also include a back button representation enabling the user to return to a previous menu.

In one implementation, the interface environment 400 includes a menu 302 and a menu title 304, e.g., "TV Shows." The menu 302 includes menu items 402, 404, 406, 408, 410, 412. The menu 302 can also include the highlight indicator 326 that can highlight a sort order option 308, 310 and/or a menu item 402-412. The menu items, can, for example, correspond to television shows that have either been, for example, recorded from a broadcast or purchased from a content provider.

In one implementation, the menu 302 also includes a sort field 306 that includes a first sort option 414 and a second sort option 416. Selection of the first sort option 414 can, for example, sort the content menu items by an episode title. In various implementations, menu items corresponding to multiple seasons of the same series title can be grouped into folders. Instances of menu items can, for example, be displayed according associated episode titles (e.g., alphabetical order) as shown in FIG. 7.

Selection of the second sort option 416 sorts the content menu items according to an air date, as indicated by the date fields 403, 405, 407, 409, 411 and 413 of FIG. 6. When menu items are to be sorted in accordance with an air date, metadata including an original air date can be retrieved. As an example, metadata including an original air date can be stored in a data store (e.g., data store 102 of FIG. 1). In another example, metadata stored in a data store (e.g., data store 102 of FIG. 1) might not include an original air date. Thus, media system 100 can include a media engine 116 configured to parse the stored metadata to extract a series title and an episode name and to retrieve an original air date associated with the series title and episode name. Original air date information can be retrieved, for example, from a content provider 214 or a metadata provider, among others. The original air dates associated with the episode names can be sorted in chronological order based upon retrieved data (e.g., original air date). The corresponding media engine 116 can be used to sort any menu items listed within the menu 302.

Figure 7:
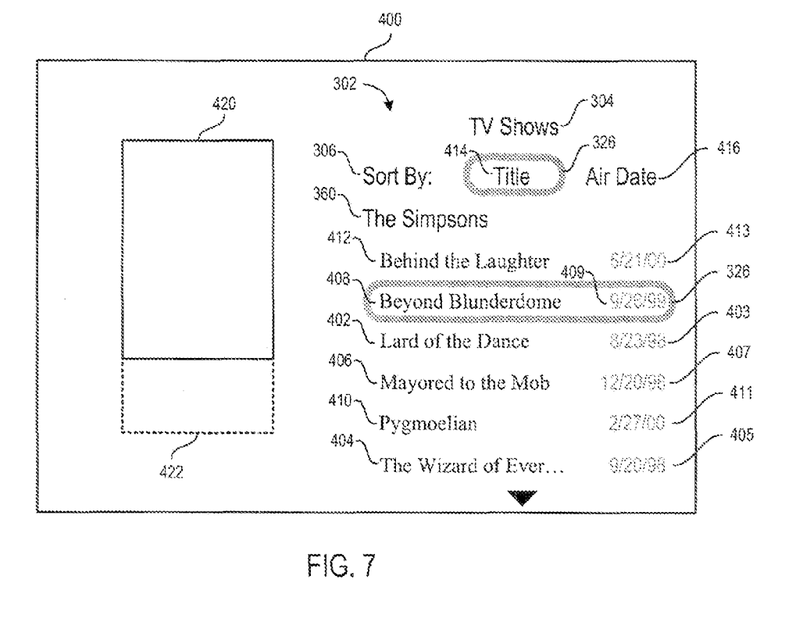

FIG. 7 is a block diagram of example interface environment 400. The example interface environment 400 corresponds to television content, and more specifically to a particular episode series title (e.g., "The Simpsons") sorted in accordance with episode title. Interface environment 400 can, for example, appear as the end result of selecting a "Title" sort option entitled from the menu 302 arranged within the user interface 400. A corresponding media engine 116 can, for example, be instantiated upon such transition.

In one implementation, the interface environment 400 includes a menu 302 and a menu title 304, e.g., "TV Shows." The menu 302 includes menu items 402, 404, 406, 408, 410, 412. The menu 302 can also include the highlight indicator 326 that can highlights a sort order option 308, 310 and/or a menu item 402-412. The menu items, can, for example, correspond to television shows that have been recorded from a broadcast or purchased from a content provider.

As described previously, the menu 302 also includes a sort field 306 that includes a first sort option 414 and a second sort option 416. Selection of the first sort option 414 can, for example, sort the content menu items by an episode title. In FIG. 7, the "Title" sort option is selected, so instances of the menu items can, for example, be displayed according title as shown in FIG. 7.

Figure 8:
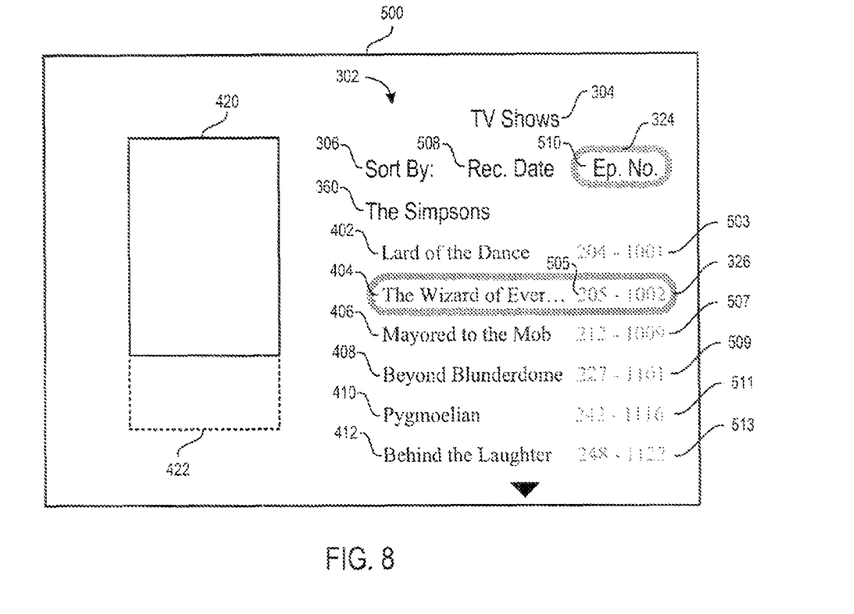

FIG. 8 is a block diagram of example interface environment 500. The example interface environment 500 corresponds to television content, and more specifically to a particular episode series title (e.g., "The Simpsons"). Interface environment 500 can, for example, appear as the end result of the transition from a higher level (e.g., closer to a "root" level) interface environment (e.g., interface environment 300 of FIG. 5) after selecting a menu item entitled "The Simpsons." A corresponding media engine 116 can, for example, be instantiated upon such transition. As an example, transitioning back to a higher level interface environment (e.g., interface environment 300 of FIG. 5) can be performed by selecting a back button on a remote control device 108. In some examples, the menu 302 can also include a back button representation enabling the user to return to a previous menu.

In one implementation, the interface environment 500 includes the menu 302 and a menu title 304, e.g., "TV Shows." The menu 302 includes menu items 402, 404, 406, 408, 410, 412. The menu 302 can also include the highlight indicator 326 that can highlight a sort order option 508, 510 and/or a menu item 402-412. The menu items 402-412, can, for example, correspond to television shows that have been recorded from a broadcast or purchased from a content provider. In some implementations, the menu items 402-412 can include television shows that are available for purchase from a content provider.

In some implementations, the menu 302 also includes a sort field 306 that includes a first sort option 508 and a second sort option 510. Selection of the first sort option 508 can, for example, sort the content menu items by a record date (e.g., an acquisition date). Alternatively, selection of the second sort option 510 sorts the content menu items according to an air date, as indicated by the episode number fields 503, 505, 507, 509, 511 and 513. When menu items are to be sorted in accordance with an episode number, metadata including an episode number can be retrieved. As an example, metadata including an episode number can be stored in a data store (e.g., data store 102 of FIG. 1). In another example, metadata stored in a data store (e.g., data store 102 of FIG. 1) might not include an episode number. Thus, media system 100 can include a corresponding media engine 116 configured to parse the stored metadata to extract a series title and an episode name and to retrieve an episode number associated with the series title and episode name. Episode number information can be retrieved, for example, from a content provider 214. Alternatively, episode number information can be retrieved from a metadata provider. The episode number associated with the series title episode names can be sorted in numerical order based upon retrieved data (e.g., episode number). One or more corresponding media engines 116 can be used to sort any menu items 402-412 listed within the menu 302.

Figure 9:
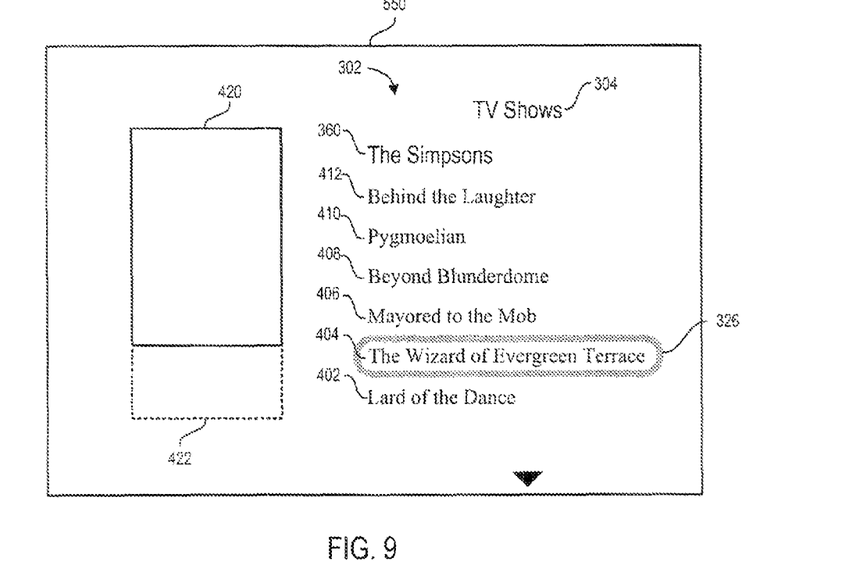

FIG. 9 is a block diagram of example interface environment 550. The example interface environment 550 corresponds to television content, and more specifically to a particular episode series title (e.g., "The Simpsons"). Interface environment 550 can, for example, appear as the end result of the transition from a higher level (e.g., closer to a "root" level) interface environment (e.g., interface environment 300 of FIG. 5) after selecting a menu item entitled "The Simpsons." A corresponding media engine 116 can, for example, be instantiated upon such transition. As an example, transitioning back to a higher level interface environment (e.g., interface environment 300 of FIG. 5) can be performed by selecting a back button on a remote control device 108. In some examples, the menu 302 can also include a back button representation enabling the user to return to a previous menu.

In one implementation, the interface environment 400 includes the menu 302 and a menu title 304, e.g., "TV Shows." The menu 302 includes menu items 402, 404, 406, 408, 410, 412. The menu 302 can also include the highlight indicator 326 that can highlight a menu item 402-412 for selection. The menu items 402-412, can, for example, correspond to television shows that have been recorded from a broadcast or purchased from a content provider. In some implementations, the menu items 402-412 can include television shows that are available for purchase from a content provider.

As described above, upon selection of the "Show" sort option from interface environment 300 of FIG. 5, episodic content can be collapsed into a show title. Upon selection of a show title from the interface environment 300 of FIG. 5, a media system 100 of FIG. 1 can transition to interface environment 550. In some example implementations, interface environment 550 can automatically sort the menu items corresponding to available content in reverse episode order, as shown by interface environment 550.

The interface environment 300 can optionally include menu item abstractions that correspond to a menu item, which in turn corresponds to associated content. For example, the menu abstractions 420, 422 correspond to one of the menu items 402-412. In one implementation, the menu item abstractions 420, 422 can be a graphical representation of the content corresponding to the highlighted menu item or metadata associated with the content corresponding to the highlighted menu item. For example, the menu item abstraction 420, which corresponds to the sorted menu items, can comprise digital representations of television program art or television program stills for television programs that are stored in a library (e.g., a data store 102, 210, content provider 214, etc.). Further, menu item abstraction 422 can comprise, for example, metadata information associated with the highlighted menu item 326

Figure 10:
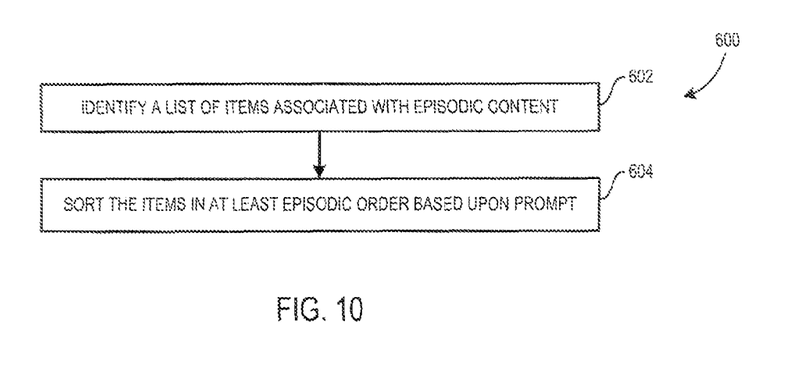
FIGS. 10-12 are flow diagrams of example organization processes.

FIG. 10 is a flow diagram of an example organization process 600. In step 602 a list of menu items is identified as being associated with episodic content. As an example, step 602 can be performed by a corresponding media engine 116. In some examples, episodic content is filtered out of the available content to provide episodic content to the user. As an example, episodic content can be television content broadcast on a regular basis or available for purchase from a content provider.

In step 604, the menu items are sorted in at least an episodic order based upon a prompt. As an example, step 602 can be performed by one or more corresponding media engines 116. In some examples, the prompt is user input received through a user interface engine 114. The menu items 402-412 can be ordered, for example, based upon an original air date or an episode number. If the original air date or episode number associated with a menu item 402-412 is not available within associated metadata, the original air date or episode number can be retrieved using a corresponding media engine 116.

Figure 11:
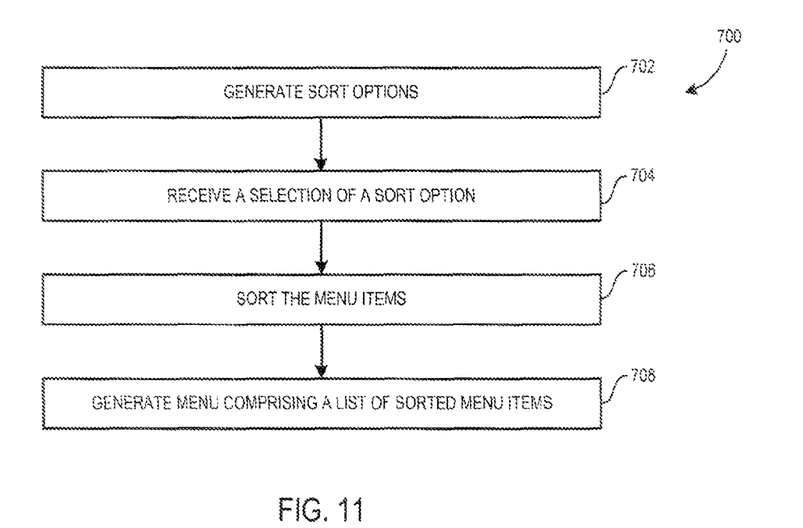

FIG. 11 is a flow diagram of an example organization process 700. In step 702, sort options are generated. As an example, the sort options can be generated by one or more corresponding media engines 116. The generation of the sort options can include at least an option for sorting based upon episode order (e.g., original air date, episode number, etc.). The generation of sort options can also include, for example, an acquisition date, title sort, etc. In various examples, the sort options are presented to the user as a list of selectable menu items 402-412.

In step 704, a selection of a episodic order sort option is received. As an example, step 704 can be provided by one or more corresponding media engines 116 and a user interface engine 114. In some implementations, a user is able to use a cursor or a highlight to navigate a menu structure 302 and to select the episodic order sort option 416.

In step 706, the menu items are sorted. Sorting of the menu items in step 706 can be performed by one or more corresponding media engines 116. The menu items 402-412 can, for example, be sorted based upon the received selected sort option from step 704. In some examples, the sort option is an episodic order sort option 416. Upon receipt of the episodic order sort option 416, the menu items 402-412 can be ordered based upon a sort order (e.g., original air date or an episode number). If the original air date or episode number associated with a menu item 402-412 is not available within associated metadata, the original air date or episode number can be retrieved using a corresponding media engine 116.

In step 708, a menu comprising the list of menu items is generated. As an example, step 708 can be provided by one or more corresponding media engines 116. The menu 302 can be arranged within an interface environment (e.g., interface environment 300, 400, 500). Moreover, proximate to the menu 302 can be arranged one or more menu item abstractions 420, 422 arranged within the interface environment 300, 400, 500. The menu item abstractions 420, 422 can be associated with a highlighted menu item 402-412. The menu item abstractions 420, 422 can include, for example, promotional media (e.g., series art, series poster(s), production stills, etc.), metadata (e.g., series title, episode title, summary description, air date, actor(s), director(s), etc.) associated with content identified by the menu items 402-412.

Figure 12:
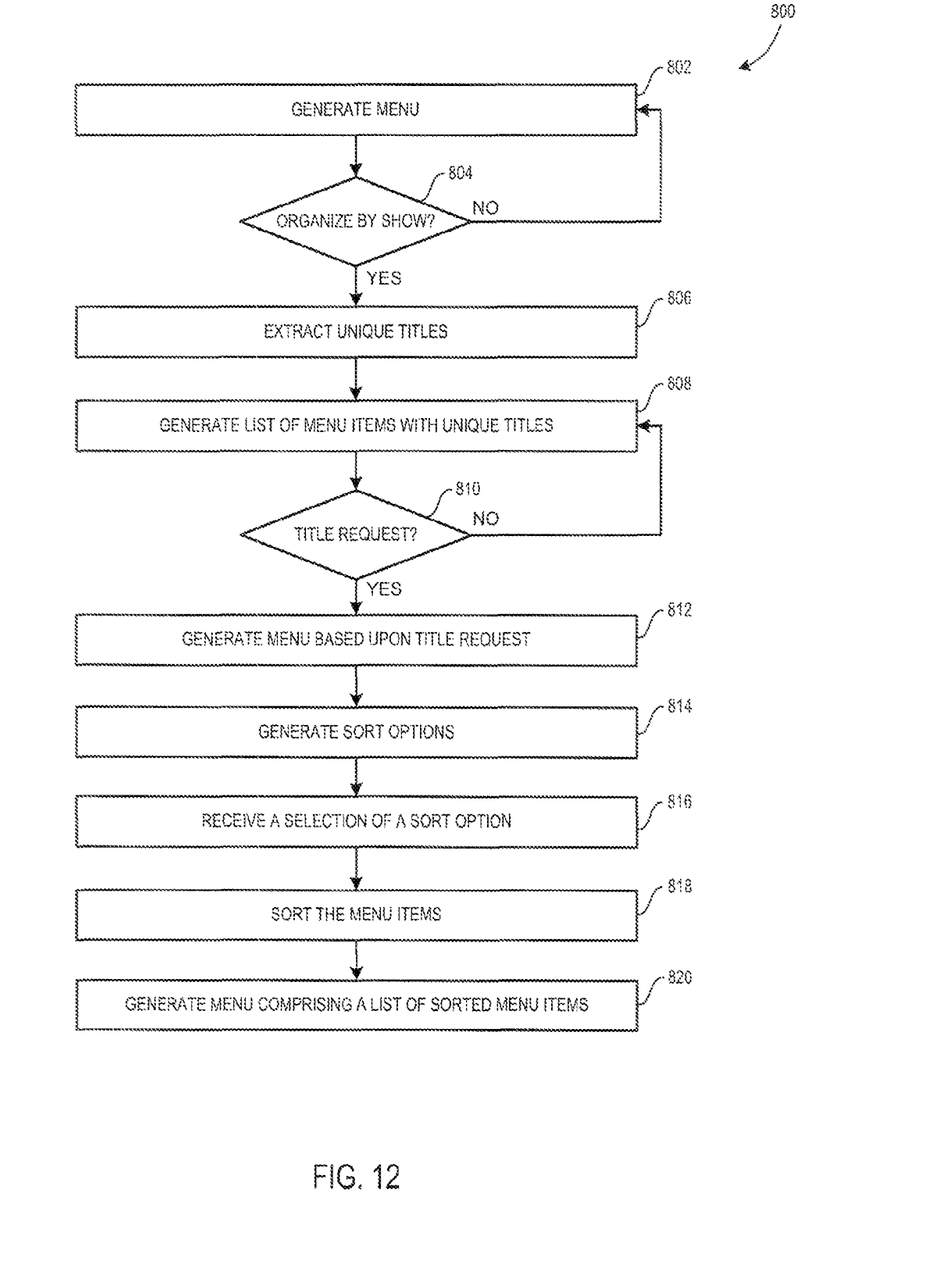

FIG. 12 is a flow diagram of an example organization process 800. In step 802, a menu is generated. As an example, the menu 302 of FIGS. 4-8 can be generated by one or more corresponding media engines 116. The generation of the menu 302 can include at least an option to organize the menu items 402-412 by, for example, show (e.g., series title).

In step 804, a determination is made whether to organize the menu items by show. As an example, the determination can be made based upon a user selection received through a user interface engine 114. Alternatively, the determination can be made based upon predefined parameters interpreted by one or more corresponding media engines 116. If the determination is that the menu items 402-412 are not being organized by show, the process can return to step 802.

However, if the determination is that the menu items are to be organized by show, then unique titles are extracted from available content in step 806. Available content in some examples can include content captured based upon broadcast media, or downloaded (e.g., purchased, subscription-based, free, etc.). As an example, step 806 can be performed by one or more corresponding media engines 116.

In step 808, a list is generated based upon the extracted unique titles. As an example, step 808 can be performed by one or more corresponding media engines 116. In some examples, the list is intended to provide the appearance of organization of related content into folders. For example, all menu items 402-412 associated with the series entitled "The Simpsons" can abstracted out of the menu items 360-370 and replaced by a plurality abstracted menu items 360-370 (e.g., "The Simpsons").

In step 810, a determination is made whether there has been a title request received. Step 810 can be performed, for example, by one or more corresponding media engines 116 or a user interface engine 114. If the determination is that no title request has been received, the process returns to step 806.

However, if the determination is that there has been a title request received, a menu based upon the title request is generated in step 812. As an example, step 812 can be performed by one or more corresponding media engines 116. The menu 302 can include any menu items 402-412 that are associated with the requested title. The menu items 402-412 can be selectable by a user, for example, by using a selector 324 (e.g., a cursor or a highlighter).

In step 814, sort options are generated. As an example, the sort options can be generated by one or more corresponding media engines 116. The generation of the sort options 414, 416, 508, 510 can include at least an option for sorting based upon episode order (e.g., original air date, episode number, etc.). The generation of sort options can also include, for example, an acquisition date, title sort, etc. In various examples, the sort options are presented to the user as a list of selectable menu items 402-412.

In step 816, a selection of a episode sort option is received. As an example, step 816 can be provided by one or more corresponding media engines 116 and a user interface engine 114. In some implementations, a user is able to use a cursor or a highlight to navigate a portion of menu structure 302 and to select the episodic order sort option 310, 416.

In step 818, the menu items are sorted. Sorting of the menu items in step 818 can be performed by one or more corresponding media engines 116. The menu items 402-412 can be sorted based upon the received selected sort option from step 816. In some examples, the sort option is an episode sort option. Upon receipt of the episode sort option, the menu items 402-412 can be ordered based upon a sort order (e.g., original air date or an episode number). If the original air date or episode number associated with a menu item 402-412 is not available within associated metadata, the original air date or episode number can be retrieved using a corresponding media engine 116.

In step 820, a menu comprising the list of menu items is generated. As an example, step 820 can be performed by one or more corresponding media engines 116. The menu 302 can be arranged within an interface environment (e.g., interface environment 400 of FIGS. 6 and 7). Moreover, proximate to the menu 302 can be arranged one or more menu item abstractions 420, 422 arranged within the interface environment. The menu item abstractions 420, 422 can be associated with a highlighted menu item. The menu item abstractions 420, 422 can include, for example, promotional media (e.g., series art, series poster(s), production stills, etc.), metadata (e.g., series title, episode title, summary description, air date, actor(s), director(s), etc.) associated with content identified by a respective menu item 402-412.

Other program content can also be sorted and presented in addition to episodic content. For example, a sports team, such as a baseball, football or basketball team, may have a periodic broadcast schedule. However, the systems and methods described herein can likewise be used to sort recorded periodic events, whether purchased or recorded from broadcasts, according to original air dates or a scheduling number.

The apparatus, methods, flow diagrams, and structure block diagrams described in this patent document can be implemented in computer processing systems including program code comprising program instructions that are executable by the computer processing system. Other implementations can also be used. Additionally, the flow diagrams and structure block diagrams described in this patent document, which describe particular methods and/or corresponding acts in support of steps and corresponding functions in support of disclosed structural means, can also be utilized to implement corresponding software structures and algorithms, and equivalents thereof.

The apparatus, methods, flow diagrams, and structure block diagrams described in this patent document can be implemented in computer processing systems including program code comprising program instructions that are executable by the computer processing system. Other implementations can also be used. Additionally, the flow diagrams and structure block diagrams described in this patent document, which describe particular methods and/or corresponding acts in support of steps and corresponding functions in support of disclosed structural means, can also be utilized to implement corresponding software structures and algorithms, and equivalents thereof.

The methods and systems described herein may be implemented on many different types of processing devices by program code comprising program instructions that are executable by one or more processors. The software program instructions may include source code, object code, machine code, or any other stored data that is operable to cause a processing system to perform methods described herein.

The systems and methods may be provided on many different types of computer-readable media including computer storage mechanisms (e.g., CD-ROM, diskette, RAM, flash memory, computer's hard drive, etc.) that contain instructions for use in execution by a processor to perform the methods' operations and implement the systems described herein.

The computer components, software modules, functions and data structures described herein may be connected directly or indirectly to each other in order to allow the flow of data needed for their operations. It is also noted that software instructions or a module can be implemented for example as a subroutine unit of code, or as a software function unit of code, or as an object (as in an object-oriented paradigm), or as an applet, or in a computer script language, or as another type of computer code or firmware. The software components and/or functionality may be located on a single device or distributed across multiple devices depending upon the situation at hand.

This written description sets forth the best mode of the invention and provides examples to describe the invention and to enable a person of ordinary skill in the art to make and use the invention. This written description does not limit the invention to the precise terms set forth. Thus, while the invention has been described in detail with reference to the examples set forth above, those of ordinary skill in the art can effect alterations, modifications and variations to the examples without departing from the scope of the invention.

What is claimed is:

1. A computer-implemented method, comprising:
   receiving episodic content including one or more episodes of television programs and storing the episodic content in a data store;
   receiving metadata associated with the episodic content and storing the received meta data in the data store;
   displaying on a display device a menu arranged in an interface environment, the menu comprising a list of menu items associated with the episodic content;
   displaying on the display device a sort interface arranged in the interface environment, the sort interface defining a plurality of sort options and being configured to receive a selection of a sort option and to sort the list of menu items based upon the selection;
   in response to receiving a selection of a sort option:
      determining whether the received metadata stored in the data store includes metadata that facilitates sorting the menu items in accordance with the sort option:
      in response to determining that the received metadata does include metadata that facilitates sorting the menu items in accordance with the sort option, sorting the menu items based on the received metadata in accordance with the sort option; and
      in response to determining that the received metadata does not include metadata that facilitates sorting the menu items in accordance with the sort option:
         extracting from the received metadata metadata that is associated with additional metadata that facilitates sorting the menu items in accordance with the sort option;
         providing the extracted metadata to a content provider and receiving the additional metadata from the content provider in response; and
         sorting the menu items based on the additional metadata in accordance with the sort option; and
      displaying on the display device the sorted menu items.

2. The method of claim 1, wherein the plurality of sort options comprise a sort option that upon selection cause the sort interface to sort the menu items based upon a purchase date associated with the episodic content.

3. The method of claim 1, wherein the plurality of sort options comprise a sort option that upon selection cause the sort interface to sort the menu items based upon series titles associated with the episodic content.

4. The method of claim 1, wherein a first episodic abstraction is arranged within the interface environment.

5. The method of claim 4, wherein the first episodic abstraction comprises art associated with the episodic content.

6. The method of claim 5, wherein the art comprises a digital representation of promotional media associated with the episodic content.

7. The method of claim 6, wherein the promotional media is further associated with a highlighted menu item.

8. The method of claim 5, wherein a second episodic abstraction is arranged within the interface environment.

9. The method of claim 1, wherein the list of menu items comprises a selectable list of episode names of the one or more episodes.

10. The method of claim 1, wherein receiving the additional metadata from the content provider comprises:
   receiving an episode number or an original air date from the content provider.

11. The method of claim 1, further comprising:
   receiving a selection of a menu item from the list of menu items; and
   requesting presentation of the selection.

12. One or more computer readable media storing instructions that are executable by a processing device, and upon such execution cause the processing device to perform operations comprising:
   receiving episodic content including one or more episodes of television programs and store the episodic content in a data store;
   receiving metadata associated with the episodic content and store the received meta data in the data store;
   generating on a display device a plurality of sort options for a plurality of menu items associated with the episodic content;
   receiving a selection of a sort option;
   in response to receiving the selection of a sort option:
      determining whether the received metadata stored in the data store includes metadata that facilitates sorting the menu items in accordance with the sort option
      in response to determining that the received metadata does include metadata that facilitates sorting the menu items in accordance with the sort option, sorting the menu items based on the received metadata in accordance with the sort option; and
      in response to determining that the received metadata does not include metadata that facilitates sorting the menu items in accordance with the sort option:
         extracting from the received metadata metadata that is associated with additional metadata that facilitates sorting the menu items in accordance with the sort option;
         providing the extracted metadata to a content provider and receiving the additional metadata from the content provider in response; and
         sorting the menu items based on the additional metadata in accordance with the sort option;
      generating a menu comprising a list of menu items based upon the sorted menu items; and
      presenting the menu arranged within an interface environment.

13. The computer readable media of claim 12, wherein the sort options comprise an option to sort based upon a purchase date associated with portions of the episodic content.

14. The computer readable media of claim 12, wherein the sort options comprise an option to sort based upon series titles associated with the episodic content.

15. The computer readable media of claim 12, further comprising presenting a first episodic abstraction arranged within the interface environment.

16. The computer readable media of claim 15, wherein the first episodic abstraction comprises art associated with the episodic content.

17. The computer readable media of claim 16, wherein the art comprises a digital representation of promotional media associated with the episodic content.

18. The computer readable media of claim 17, wherein the promotional media is further associated with a highlighted menu item.

19. The computer readable media of claim 16, further comprising presenting a second episodic abstraction arranged within the interface environment.

20. The computer readable media of claim 12, wherein the list of menu items comprises a selectable list of episode names respectively associated with the one or more episodes.

21. The computer readable media of claim 12, further comprising:
   receiving a content selection of a menu item from the list of menu items; and
   requesting presentation of the episodic content based upon the content selection.

22. The computer readable media of claim 12, wherein the extracted metadata comprises a series title and an episode name of an episode of the one or more episodes.

23. The computer readable media of claim 22, wherein the additional metadata comprises at least one of an episode number and an original air date for the episode.

24. The method of claim 1, wherein:
   extracting from the received metadata metadata that is associated with additional metadata that facilitates sorting the menu items in accordance with the sort option comprises parsing the stored metadata to extract a series title and episode names of the episodic content; and
   providing the extracted metadata to a content provider and receiving the additional metadata from the content provider in response comprises providing the series title and the episode names to the content provided and receiving original air dates of the episodic content for each series title in response.

25. The method of claim 1, wherein the plurality of sort options include a series title option and an air date option, and each television program has a corresponding program title, and each episode has a corresponding episode title; and
   in response to receiving a selection of the series title option:
      generating a list of first menu items, each first menu item being a program title of a television program;
      for each menu item, determining if the data store includes multiple stored episodes of the television program to which the program title corresponds;
      in response to determining that the data store includes multiple stored episodes of the television program to which the program title corresponds, displaying a child indicator with the menu item that, in response to a selection of the child indicator, causes the list of menu items on the display device to be replaced with a list of second menu items, each second menu item being one of the episode titles of the television program to which the program title corresponds; and in response to determining that the data store includes only one stored episode of the television program to which the program title corresponds:
displaying the menu item with an air date of the corresponding one stored episode of the television program; and
in response to receiving a selection of the date option:
generating a list of third menu items, each third menu item being a program title of a television program and corresponding to only one episode of the television program, and including an air date of the corresponding one episode.

26. The computer readable medium of claim 22, wherein the sort options include a series title option and an air date option, and each television program has a corresponding program title, and each episode has a corresponding episode title; and
in response to receiving a selection of the series title option:
generating a list of first menu items, each first menu item being a program title of a television program;
for each menu item, determining if the data store includes multiple stored episodes of the television program to which the program title corresponds;
in response to determining that the data store includes multiple stored episodes of the television program to which the program title corresponds, displaying a child indicator with the menu item that, in response to a selection of the child indicator, causes the list of menu items on the display device to be replaced with a list of second menu items, each second menu item being one of the episode titles of the television program to which the program title corresponds; and
in response to determining that the data store includes only one stored episode of the television program to which the program title corresponds:
displaying the menu item with an air date of the corresponding one stored episode of the television program; and
in response to receiving a selection of the date option:
generating a list of third menu items, each third menu item being a program title of a television program and corresponding to only one episode of the television program, and including an air date of the corresponding one episode.

27. A media processing system, comprising:
a processing device; and
a computer memory device in data communication with the processing device and including instructions executable by the processing device and upon such execution cause the processing device to perform operations comprising:
receiving episodic content including one or more episodes of television programs and storing the episodic content in a data store;
receiving metadata associated with the episodic content and storing the received meta data in the data store;
displaying on a display device a menu arranged in an interface environment, the menu comprising a list of menu items associated with the episodic content;
displaying on the display device a sort interface arranged in the interface environment, the sort interface defining a plurality of sort options and being configured to receive a selection of a sort option and to sort the list of menu items based upon the selection;
in response to receiving a selection of a sort option:
determining whether the received metadata stored in the data store includes metadata that facilitates sorting the menu items in accordance with the sort option:
in response to determining that the received metadata does include metadata that facilitates sorting the menu items in accordance with the sort option, sorting the menu items based on the received metadata in accordance with the sort option; and
in response to determining that the received metadata does not include metadata that facilitates sorting the menu items in accordance with the sort option:
extracting from the received metadata metadata that is associated with additional metadata that facilitates sorting the menu items in accordance with the sort option;
providing the extracted metadata to a content provider and receiving the additional metadata from the content provider in response; and
sorting the menu items based on the additional metadata in accordance with the sort option; and
displaying on the display device the sorted menu items.

28. The system of claim 27, wherein the plurality of sort options comprise a sort option that upon selection cause the sort interface to sort the menu items based upon a purchase date associated with the episodic content.

29. The system of claim 27, wherein the plurality of sort options comprise a sort option that upon selection cause the sort interface to sort the menu items based upon series titles associated with the episodic content.

30. The system of claim 27, wherein a first episodic abstraction is arranged within the interface environment.

31. The system of claim 27, wherein the list of menu items comprises a selectable list of episode names of the one or more episodes.

32. The system of claim 27, wherein receiving the additional metadata from the content provider comprises:
receiving an episode number or an original air date from the content provider.

33. The system of claim 27, further comprising:
receiving a selection of a menu item from the list of menu items; and
requesting presentation of the selection.

* * * * *

UNITED STATES PATENT AND TRADEMARK OFFICE
CERTIFICATE OF CORRECTION

| | | |
|---|---|---|
| PATENT NO. | : 8,099,665 B2 | Page 1 of 1 |
| APPLICATION NO. | : 11/530643 | |
| DATED | : January 17, 2012 | |
| INVENTOR(S) | : Brodersen et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 602 days.

Signed and Sealed this
Twenty-ninth Day of May, 2012

David J. Kappos
*Director of the United States Patent and Trademark Office*